US008147915B2

(12) United States Patent
Bate et al.

(10) Patent No.: US 8,147,915 B2
(45) Date of Patent: Apr. 3, 2012

(54) NON-STICK COATING COMPOSITION

(75) Inventors: Thomas James Bate, Glenview, IL (US); Arthur Wachowski, Huntley, IL (US)

(73) Assignee: Whitford Corporation, Elverson, PA (US)

( * ) Notice: Subject to any disclaimer, the term of this patent is extended or adjusted under 35 U.S.C. 154(b) by 387 days.

(21) Appl. No.: 12/432,966

(22) Filed: Apr. 30, 2009

(65) Prior Publication Data

US 2009/0297855 A1 Dec. 3, 2009

Related U.S. Application Data

(60) Provisional application No. 61/049,044, filed on Apr. 30, 2008.

(30) Foreign Application Priority Data

May 21, 2008 (EP) .................................. 08156664

(51) Int. Cl.
*B05D 5/08* (2006.01)

(52) U.S. Cl. ..................... 427/387; 427/207.1; 427/384; 427/385.5; 427/386; 427/388.1; 427/388.4; 427/402; 427/407.1; 427/409; 427/410; 428/413; 428/418; 428/446; 428/447; 428/450; 428/421; 524/136; 524/147; 524/261; 524/267; 524/268; 524/366; 524/370; 524/372; 524/375; 524/462; 524/437; 524/500; 524/540

(58) Field of Classification Search ................. 27/207.1, 27/384, 385.5, 386, 387, 388.1, 388.4, 402, 27/407.1, 409, 410; 428/413, 418, 446, 447, 428/450, 421; 524/136, 147, 261, 267, 268, 524/366, 370, 372, 375, 462, 437, 500, 540; 274/207.1, 384, 385.5, 386, 387, 388.1, 388.4, 274/402, 407.1, 409, 410

See application file for complete search history.

(56) References Cited

U.S. PATENT DOCUMENTS

| 4,353,950 | A | * | 10/1982 | Vassiliou | 428/195.1 |
| 4,369,279 | A | * | 1/1983 | Emerick | 524/267 |
| 4,954,553 | A | * | 9/1990 | Johnson et al. | 524/376 |
| 5,079,073 | A | * | 1/1992 | Tannenbaum | 428/216 |
| 5,389,704 | A | * | 2/1995 | Yabu | 523/406 |
| 5,691,067 | A | | 11/1997 | Patel | |
| 6,863,974 | B2 | * | 3/2005 | Shah et al. | 428/325 |

FOREIGN PATENT DOCUMENTS

| EP | 0361519 A2 | | 4/1990 |
| EP | 0 669 384 | * | 2/1995 |
| WO | WO2008/051901 A2 | | 5/2008 |

OTHER PUBLICATIONS

International Preliminary Examination Report mailed Nov. 11, 2010 from WIPO in related International Application No. PCT/EP2009/055013.

European examination report mailed Apr. 21, 2010 in related European application No. 08156664.8.

* cited by examiner

*Primary Examiner* — Vasu Jagannathan
*Assistant Examiner* — Robert C Boyle
(74) *Attorney, Agent, or Firm* — Faegre Baker Daniels LLP

(57) ABSTRACT

A non-stick coating composition comprising a waterborne phenoxy resin, a crosslinker, a silicone compound, and a Fluoropolymer. An article, such as aluminum, may be coated with the composition. The composition may be multi-layers, but only the layers other than the first layer includes the silicone compound. The invention includes the method for applying the coating or coatings.

29 Claims, No Drawings

NON-STICK COATING COMPOSITION

CROSS-REFERENCE TO RELATED APPLICATIONS

The present application claims the benefit of U.S. Provisional Application No. 61/049,044 filed on Apr. 30, 2008, which is incorporated herein in its entirety by reference.

FIELD OF THE INVENTION

The present invention relates to coating compositions having non-stick applications.

BACKGROUND OF THE INVENTION

Non-stick coatings are well known in the art. In these coatings normally fluoropolymers are used, since these resins have a low surface energy as well as thermal and chemical resistance. However, non-stick coatings based upon fluoropolymers are limited with regard to abrasion resistance and resistance to flame contact, as well as adhesion to metal substrates. Such coatings are easily damaged when cut with a knife or another metal tool. Rubbing or sanding also easily wears these coatings away.

It is also known to crosslink water borne phenoxy resin with phenolics and melamine resins to form coatings for steel and aluminum.

Non-stick coatings may be applied in a single layer or as a multilayer coating.

Surprisingly it has been found that a superior non-stick coating can be obtained without the use of fluoropolymers, but with the incorporation of a silicone compound in a composition comprising a phenoxy resin and a crosslinker.

SUMMARY OF THE INVENTION

Accordingly, in one embodiment the present invention comprises a non-stick coating composition comprising a phenoxy resin, a crosslinker and a silicone compound and a Fluoropolymer.

In another embodiment, the invention comprises a method of applying the above coating composition to a substrate, followed by drying and curing the coating composition.

In a further embodiment, the invention comprises applying the above coating composition to a substrate comprising the sequential steps of:
  A. Preparing the surface of the substrate for the coating;
  B. Applying the coating as a one coat or multi coat non-stick coating, where the first coat comprises the phenoxy resin and crosslinker, and a silicone compound and a Fluoropolymer if the coating is applied as a one coat non-stick coating, and, if the coating is applied as a multi-coat non-stick coating, one or more of the coats other than the first coat comprises a silicone compound and a Fluoropolymer; and
  C. Baking the coated substrate to cure the coating. This typically occurs at temperatures ranging from about 200 to 350° C.

Other embodiments of the invention comprise details concerning compositions, relative amounts of ingredients, particle sizes and method steps.

DETAILED DESCRIPTION OF THE INVENTION

One component of the composition of the present invention is a phenoxy resin. Phenoxy resin is a generic term used to describe the amorphous, high-molecular-weight poly(hydroxy ethers) derived from diphenols and epichlorohydrin. Poly(hydroxy ethers) are high strength, high-modulus materials which are thermally stable because they lack terminal epoxy groups, are easily fabricated, and have been used as molded objects, film, packaging material, coatings, and adhesives. Phenoxy resin emulsions or colloidal dispersions are particularly useful as an ingredient for the composition of the present invention. Combined with an appropriate crosslinker, the phenoxy resin will provide adhesion, and also a heat and abrasion resistant polymer matrix.

In one embodiment, the composition comprises a phenoxy resin in an amount of at least 25 wt. %, based on the total solids of the composition.

In a further embodiment, the composition comprises a phenoxy resin in an amount of at least 35 wt. %, based on the total solids of the composition.

In a further embodiment, the composition comprises a phenoxy resin in an amount of at least 40 wt. %, based on the total solids of the composition.

In one embodiment, the composition comprises a phenoxy resin in an amount of less than 75 wt. %, based on the total solids of the composition.

In a further embodiment, the composition comprises a phenoxy resin in an amount of less than 65 wt. %, based on the total solids of the composition.

In a further embodiment, the composition comprises a phenoxy resin in an amount of less than 60 wt. %, based on the total solids of the composition.

Other components of the present invention are:

Any crosslinker that enables polymers to form with the phenoxy resin is appropriate. Melamine (cyanurotriamide cyanuramide 2,4,6-tri-amino-8-triazine) is a preferred crosslinker.

In one embodiment, the composition comprises a crosslinker in an amount of at least 5 wt. %, based on the total solids of the composition.

In a further embodiment, the composition comprises a crosslinker in an amount of at least 10 wt. %, based on the total solids of the composition.

In one embodiment, the composition comprises a crosslinker in an amount of less than 20 wt. %, based on the total solids of the composition.

In a further embodiment, the composition comprises a crosslinker in an amount of less than 15 wt. %, based on the total solids of the composition.

Silicone is an elastomer in which the C linkages of a polymerized hydrocarbon are replaced by Si—O linkages. Particularly preferred silicones for use with the composition of the present invention are silicone fluids and fluid emulsions, particularly silicone and water emulsions, as well as silicone resin emulsions, or combinations thereof.

In a preferred embodiment the silicone compound is a non cross-linkable silicone compound.

In one embodiment, the composition comprises a silicone compound in an amount of at least 5 wt. %, based on the total solids of the composition.

In a further embodiment, the composition comprises a silicone compound in an amount of at least 10 wt. %, based on the total solids of the composition.

In one embodiment, the composition comprises a silicone compound in an amount of less than 65 wt. %, based on the total solids of the composition.

In a further embodiment, the composition comprises a silicone compound in an amount of less than 40 wt. %, based on the total solids of the composition.

In a further embodiment, the composition comprises a silicone compound in an amount of less than 20 wt. %, based on the total solids of the composition.

Fluoropolymers for use in the invention may be selected from the group consisting of PTFE (Polytetrafluoroethylene), copolymers of TFE (Tetrafluoroethylene) with such co-monomers as PMVE (perfluoromethylvinylether), PPVE (perfluoropropylvinyl ether), HFP (hexafluoropropylene), Ethylene, CTFE (Chlorotrifluoroethylene) and combinations of the above comonomers.

In a preferred embodiment the fluoropolymer is substantially free from any residues of PFOS (Perfluorooctane sulfonate) and any residues of PFOA (perflourooctanoic acid).

In this context, substantially free of these residues means that the Fluoropolymer contains less then 100 ppb (parts per billion), more preferably less then 10 ppb of PFOS and/or PFOA.

Fluoropolymers can also be referred to as fluorocarbon resins.

In one embodiment, the composition comprises a Fluoropolymer in an amount of more than 5 wt. %, based on the total solids of the composition.

In a further embodiment, the composition comprises a Fluoropolymer in an amount of at least 15 wt. %, based on the total solids of the composition.

In a further embodiment, the composition comprises a Fluoropolymer in an amount of at least 20 wt. %, based on the total solids of the composition.

In one embodiment, the composition comprises a Fluoropolymer in an amount of less than 35 wt. %, based on the total solids of the composition.

In a further embodiment, the composition comprises a Fluoropolymer in an amount of less than 30 wt. %, based on the total solids of the composition.

In a further embodiment, the composition comprises a Fluoropolymer in an amount of less than 25 wt. %, based on the total solids of the composition.

It is preferred that epoxies be included in the composition of the invention. Phosphoric acid modified epoxy functional aqueous emulsions are most preferred.

In one embodiment, the composition comprises an epoxy compound in an amount of from 0 to 10 wt. %, based on the total solids of the composition.

In a further embodiment, the composition comprises an epoxy compound in an amount of from 0 to 5 wt. %, based on the total solids of the composition.

In a further embodiment, the composition comprises an epoxy compound in an amount of from 0 to 4 wt. %, based on the total solids of the composition.

According to one embodiment of the present invention, a substrate, such as aluminum or aluminum shaped articles, is coated with a non-stick coating comprising the composition of the present invention. Multi-coats may be applied, but, in case a one coat non-stick coating is applied, it is essential that that coat comprises the product of a mixture of waterborne phenoxy resin, a crosslinker, a silicone compound, and a Fluoropolymer. When applied as a multi-coat system, it is essential that at least one coat other than the first coat (e.g. midcoat and topcoat) comprise a silicone component.

It is preferred that, when the coating is a single coat, that coat comprises the product of a mixture of waterborne phenoxy resin and crosslinker, an epoxy and a polyamideimide resin, and when the coating is multi-layer, coats other than the exterior coat comprise the product of a mixture of waterborne phenoxy resin and crosslinker, an epoxy and a polyamideimide resin.

A preferred first coat (primer) in a multi coat system may comprise the product of a mixture of waterborne phenoxy resin and crosslinker, but a silicone component is precluded.

Based on the amount of total solid resin, a preferred composition of the invention comprises 30-85 wt. % phenoxy resin, 0-15 wt. % epoxy, 8-25 wt. % crosslinker and 5-70 wt. % silicone.

The first coat (primer) and the second and/or third coat (midcoat and/or topcoat) may also comprise one or more of the following components: fillers, pigments, surfactants, solvents, defoamers, and any other component for a coating composition known to the person skilled in the art; from about 10 wt. % to about 60 wt. % of inorganic inert particles and from about 10 wt. % to about 60 wt. % of other ingredients selected from the group consisting of fillers, pigments, surfactants, solvents, defoamers and mixtures thereof, the wt. % being calculated on basis of the solid content of the primer composition.

The fillers in the first coat (primer) compositions may be selected from the group consisting of barium sulfate, calcium sulfate, calcium carbonate, silicas and silicates, silicon carbide and aluminum oxide.

The first coat (primer) and other coats (midcoat and or topcoat) may include inorganic particles which are inert with respect to the other components that are present in the composition and can withstand a continuous service temperature in excess of 250° C. In addition, these particles are also stable at the eventual baking temperature of the non-stick coating. The particles are also not soluble in water or any other solvent that is present in the composition. The preferred amount of inorganic particles comprises 10-110 wt. % based on the total solid resin.

Examples of suitable inorganic particles include inorganic oxides, carbides or nitrides of elements in groups IIA-VB of the periodic table and natural minerals and mixtures thereof. Preferred inorganic particles include particles with an average particle size of at least 3 micrometers and more preferably in the range from about 5 to about 20 micrometers. The inorganic particles have a preferred Mohs hardness of at least about 5, more preferably a Mohs hardness of at least about 6. Examples of inorganic particles with Mohs hardness above 5 include alumina, zirconia, silicon carbide, titanium carbide, aluminum boride, and cristobalite.

In addition to the inorganic inert particles mentioned above, the coating compositions used according to the present invention can also comprise fillers, additives, and pigments that are commonly used in the preparation of coating compositions. Fillers can be any fillers known to those skilled in the art, e.g., barium sulfate, calcium sulfate, calcium carbonate, silicas or silicates (such as talc, feldspar, and china clay). Additives such as stabilizers, antioxidants, leveling agents, ant settling agents, matting agents, rheology modifiers, surface-active agents, UV light absorbers, light stabilizers, amine synergists, waxes, or adhesion promoters can also be added.

The substrates coated according to the present invention can be aluminum shaped articles, such as pots, pans, lids, mixing spoons, and all other utensils usually employed for food preparation and cooking (baking pans, oven racks, etc.) as well as aluminum sheet to be shaped into the aforesaid articles. In both cases, the aluminum support is simply degreased according to any known method, e.g., in an alkaline or acid environment, or with organic solvents. In this treatment, the aluminum support maintains the surface roughness of the aluminum sheet, i.e. below 1.2 micrometers. In addition to the degreasing it is possible to roughen the surface.

Other metals may be suitable substrates, such as grit blasted stainless steel. The following applies to the examples given below:

Scotch Brite Abrasion Test

The Scotch Brite Abrasion' Test measures a coating's resistance to a constant scrubbing with an abrasive scouring pad. The vertical load on the scouring pad is set to 10 pounds (4.54 kg), and the scouring pad is changed every 10,000 strokes. The number of cycles that are required to scrape the coating down to bare metal is recorded in order to gauge the abrasion resistance of the non-stick system.

Egg Release Test

A pan coated with non-stick coating is heated to 150° C., after which an egg is fried. The level of release is rated as follows;

Egg Release Grading Scale (Cleaning with Dishwasher Detergent/Water)
1. Very poor: Egg sticks to wear track and difficult to clean
2. Very poor: Egg sticks to wear track but cleaning somewhat easier
3. Very poor: Egg sticks to 90% of wear track but cleaned fairly easy
4. Very poor: Egg sticks to 80% of wear track but cleaned fairly easy
5. Poor: Egg sticks to 70% of wear track but cleaned fairly easy
6. Fair: Egg sticks to 60% of wear track but cleaned fairly easy
7. Fair: Egg sticks to 20-40% of wear track but cleaned fairly easy
8. Good: Egg sticks to 10% of wear track but cleaned easily
9. Very good: Egg could be removed intact with some difficulty, easy cleaning
10. Excellent: Clean removal of egg intact, no residue left.

Hand Held Tiger Paw Test

The hand held "Tiger Paw" device is an industry-accepted standard, which was designed to test the resistance of a non-stick coating to long-term kitchen abuse. The Hand Held Tiger Paw consists of a weighted apparatus, which uses three "ball point" pens to scratch the coating film. The cookware which is being tested is filled with a thin layer of cooking oil, and heated to 400° Fahrenheit (205° Celsius.)

The Tiger Paw is rotated over the non-stick surface in a circular fashion 2000 times, changing direction every 100 rotations. The coating is then examined for any fraying, blistering, or penetration to bare metal.

EXAMPLES

The invention will be elucidated with reference to the following examples. These are intended to illustrate the invention but are not to be construed as limiting in any manner the scope thereof.

Example 1

A non-stick coating composition according to the present invention was comprising the following ingredients:

| Ingredient | Solid content | Content in composition (pbw) |
|---|---|---|
| Phenoxy resin PKH34 | 34% solids | 40.42 |
| Silicone resin Wacker 42EA | 42% solids | 10.21 |
| water | | 23.86 |
| amine | | 0.95 |
| Prop glycol | | 5.24 |
| surfynol 440 | | 2.02 |
| Dow PM | | 1.31 |
| Cymel 323 | | 4.32 |

-continued

| Ingredient | Solid content | Content in composition (pbw) |
|---|---|---|
| aluminum oxide | 100% solids | 2.98 |
| pigments | | 0.24 |
| PTFE | 100% solid | 7.14 |
| thickener | 50% solids | 1.31 |

This non-stick coating composition was applied as a topcoat to an aluminum substrate with a standard basecoat.

Control 1

A state of the art, PTFE (polytetrafluoroethylene) containing 2 coat non-stick coating was prepared as follows and as described in U.S. Pat. No. 6,863,974 B2: A primer comprised of 33.0 wt. % polyamideimide (Torlon AI 10 from Solvay), 38.0 wt. % SiC (#600W from Electro Abrasive Powders, average particle size of 11 microns) and no Fluoropolymer component, and a topcoat comprised of 58.14 wt. % PTFE dispersion (Fluon GP1 from Asahi Glass) and 0.5 wt. % polyamideimide (Torlon AI 10 from Solvay) was applied to a non-gritblasted hard anodized aluminum substrate in the form of a frying pan, such that a dry film thickness of 0.5 mil primer and 0.5 mil topcoat was obtained, following a final bake of 3-5 minutes at 427° C. (metal temperature). The resulting baked film was comprised of 33.0 wt. % PAI (polyamideimide) and 38.0 wt. % SiC in the primer and 90.3 wt. % PTFE and 1.3 wt. % PAI in the topcoat layer. This 2 coat system was applied to an aluminum substrate.

Both the coating to the present invention and the control were tested in accordance with the methods described above. The results are given in Table 1

TABLE 1

| | Test results | |
|---|---|---|
| Test method | Example 1 | Control 1 |
| Egg release | 9-10 | 10 |
| Tiger paw | Pass 2000 cycles | Failed @ 1500 cycles |
| Scotchbrite abrasion | 90,000 cycles | 10,000 cycles |

What is claimed is:

1. A non-stick coating composition comprising:
at least 40 wt. % based on total solids of the composition a waterborne phenoxy resin, said phenoxy resin lacking terminal epoxy groups;
a crosslinker;
at least more than 5 wt. % based on total solids of the composition of a silicone compound; and
from 5 to 30 wt % based on total solids of the composition of a fluoropolymer.

2. The coating composition of claim 1, wherein said crosslinker is melamine.

3. The coating composition of claim 1, further comprising one or more epoxies.

4. The coating composition of claim 3, wherein the one or more epoxies comprises a phosphoric acid modified epoxy functional aqueous emulsion.

5. The coating composition of claim 1, wherein said coating composition is a single coat, and further comprises at least one of a polyamideimide and an epoxy.

6. The coating composition of claim 1, comprising on the basis of total solids of the composition:
40-75 wt. % of the phenoxy resin,
5-20 wt. % of the crosslinker,
5-65 wt. % of the silicone compound, and 5-35 wt. % of the fluoropolymer;
and wherein the coating composition further comprises 0-10 wt. % of an epoxy, on the basis of total solids of the composition.

7. The coating composition of claim 1, further comprising inorganic particles with Mohs hardness of at least 5, wherein the inorganic particles are present in an amount of 10-110 wt. % of total solid resin.

8. A coated article comprising a substrate coated with the coating composition of claim 1.

9. The coated article of claim 8, wherein said article further comprises a multi-coat non-stick system including a first coat and an exterior coat, wherein said first coat is not formed from a mixture containing the silicone compound, and at least one of the other coats is formed from a mixture containing the silicone compound.

10. The coated article of claim 9, wherein said coats other than said exterior coat comprise the product of a mixture of the waterborne phenoxy resin, the crosslinker, and at least one of an epoxy resin and a polyamideimide resin.

11. The coated article of claim 9, wherein one or more of said coats contain a filler selected from the group consisting of barium sulfate, calcium sulfate, calcium carbonate, silicas and silicates.

12. A method of coating a substrate comprising applying a coating composition according to claim 1 to said substrate, followed by drying and curing said coating composition.

13. The method of claim 12, wherein said substrate comprises aluminum or a shaped aluminum article.

14. The method of claim 12, wherein said substrate comprises grit blasted stainless steel or a shaped grit blasted stainless steel article.

15. The method of claim 12, wherein said phenoxy resin is applied as a dispersion of said resin in water with a surfactant.

16. The method of claim 12, wherein said phenoxy resin is applied as a polymer powder with an organic liquid.

17. The method of claim 12, wherein said crosslinker is melamine.

18. A method of coating a substrate comprising applying a coating composition according to claim 1 to said substrate, wherein said applying includes the sequential steps of:
preparing the surface of the substrate for the coating composition;
applying the coating composition as a one coat or a multi-coat non-stick coating, wherein the first coat comprises the phenoxy resin, the crosslinker, and the silicone compound if the coating is applied as the one coat non-stick coating, and, if the coating is applied as the multi-coat non-stick coating, one or more of the coats other than the first coat comprises the silicone compound; and
baking the coated substrate to cure the coating composition.

19. The method of claim 18, wherein said baking is carried out at temperatures ranging from about 200 to 350° C.

20. The method of claim 18, wherein said crosslinker is melamine.

21. The coating composition of claim 1, comprising between 40 wt. % and 75 wt. % phenoxy resin based on total solids of the composition.

22. The coating composition of claim 1, comprising between 40 wt. % and 65 wt. % phenoxy resin based on total solids of the composition.

23. The coating composition of claim 1, comprising between 5 wt. % and 20 wt. % crosslinker based on total solids of the composition.

24. The coating composition of claim 1, comprising between 10 wt. % and 65 wt. % silicone compound based on total solids of the composition.

25. A non-stick coating composition comprising:
at least 40 wt. % based on total solids of the composition a waterborne phenoxy resin, said phenoxy resin lacking terminal epoxy groups;
at least 5 wt. % based on total solids of the composition of a crosslinker;
at least more than 5 wt. % based on total solids of the composition of a silicone compound; and
from 5 to 30 wt % based on total solids of the composition of a fluoropolymer.

26. The coating composition of claim 25, comprising between 40 wt. % and 75 wt. % phenoxy resin based on total solids of the composition.

27. The coating composition of claim 25, comprising between 40 wt. % and 65 wt. % phenoxy resin based on total solids of the composition.

28. The coating composition of claim 25, comprising at least 10 wt. % crosslinker, based on total solids of the composition.

29. The coating composition of claim 25, comprising between 10 wt. % and 65 wt. % silicone compound based on total solids of the composition.

* * * * *